United States Patent [19]
Bright

[11] 3,771,265
[45] Nov. 13, 1973

[54] GLASS LENS EDGING APPARATUS FOR SENSING LENS HOLDING FRAMES

[76] Inventor: Charles R. Bright, 8423 E. Hubbell, Scottsdale, Ariz. 85257

[22] Filed: Jan. 21, 1972

[21] Appl. No.: 219,634

[52] U.S. Cl................................ 51/101 LG, 51/284
[51] Int. Cl................................................ B24b 9/08
[58] Field of Search..................... 51/100 R, 101 LG, 51/284, 127

[56] References Cited
UNITED STATES PATENTS

| | | | |
|---|---|---|---|
| 900,664 | 10/1908 | Clark | 51/101 LG |
| 3,170,374 | 2/1965 | Clar | 51/101 LG X |
| 3,555,739 | 1/1971 | Novak | 51/284 X |
| 3,672,855 | 6/1972 | Bright | 51/101 LG |

Primary Examiner—Donald G. Kelly
Assistant Examiner—Howard N. Goldberg
Attorney—Warren F. B. Lindsley

[57] ABSTRACT

A glass lens edging apparatus which senses the inside periphery of a lens holding frame at a plurality of points and uses pneumatic, electrical or hydraulic actuated sensor points for controlling lens forming equipment.

7 Claims, 14 Drawing Figures

PATENTED NOV 13 1973 3,771,265

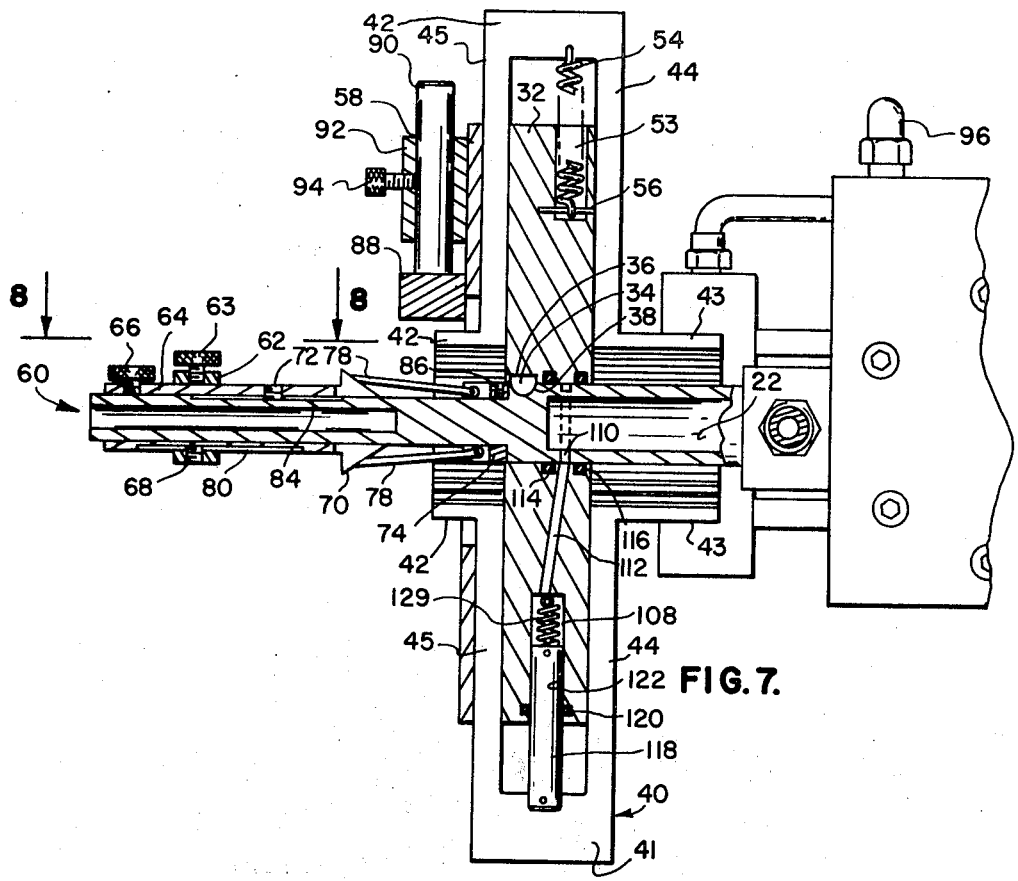
FIG. 7.
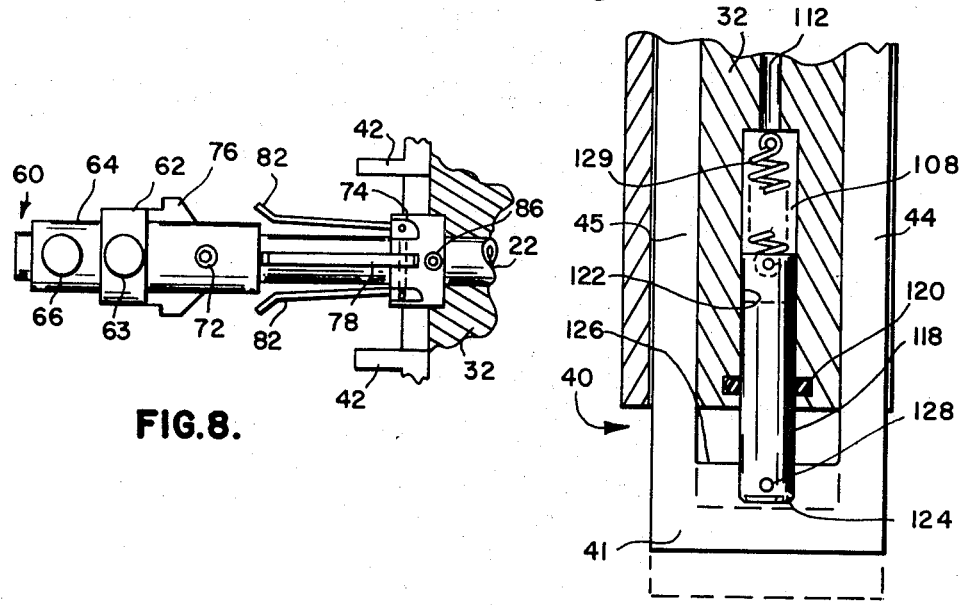
FIG. 8.
FIG. 9.

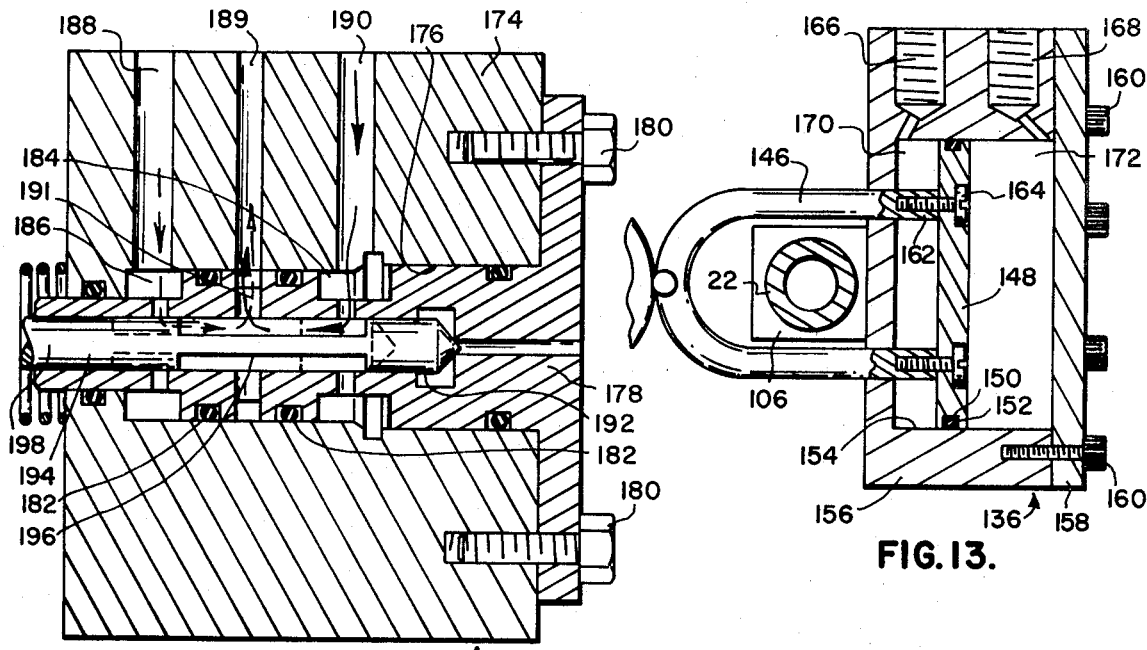
FIG. 12.
FIG. 13.
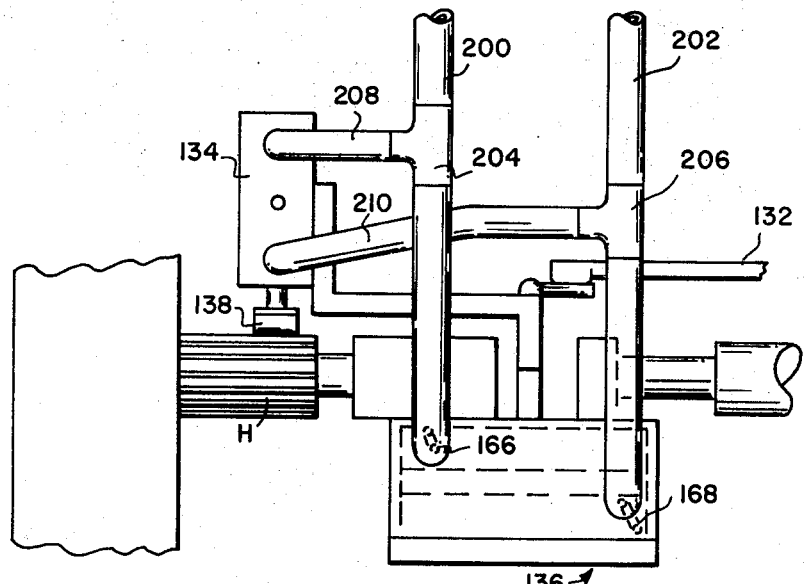
FIG. 14.

GLASS LENS EDGING APPARATUS FOR SENSING LENS HOLDING FRAMES

BACKGROUND OF THE INVENTION

This invention relates to lens forming equipment and more particularly to an improved glass lens shaping and sizing attachment for such equipment.

FIELD OF THE INVENTION

This invention is directed to an attachment for eye glass bevel edging equipment which senses the eye glass frame for holding a particular lens thereby eliminating the need for patterns for each glass lens configuration.

DESCRIPTION OF THE PRIOR ART

Heretofore glass lens edging machines have sensed the edge of a preformed pattern for controlling the duplication of the lens edge in an eye glass edging machine. Each different lens configuration required a different pattern and the patterns or cam contours for each and every lens size or style had to be cataloged and stored for later reuse if the lens cost was to be kept reasonable.

SUMMARY OF THE INVENTION

In accordance with the invention claimed a new and improved attachment for eye glass bevel edging equipment is provided which eliminates cam shaped patterns presently used for sizing and shaping lenses to fit the eye glass frame.

Accordingly, it is one object of this invention to provide an improved lens frame sensing attachment for lens edging equipment.

Another object of this invention is to provide an attachment for eye glass bevel edging machines which eliminates the cam patterns presently used for sizing and shaping lenses to fit an eye glass frame.

A further object of this invention is to provide a servo mechanism having a plurality of sensors directly engaging and sensing the inside periphery of an eye glass frame for controlling the duplication of the lens edge in any eye glass lens edging machine.

A still further object of this invention is to provide a plurality of pheumatic, electrical or hydraulic actuated sensing means for engaging a plurality of points around the periphery of an eye glass frame for controlling a lens grinding machine.

A still further object of this invention is to eliminate the necessity of maintaining a large file of cam contours for cutting lenses.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which:

FIG. 7 is a vertical sectional view taken along the line 7—7 of FIG. 5;

FIG. 8 is an enlarged partial plan view taken along the line 8—8 of FIG. 7;

FIG. 9 illustrates an enlarged partial section of the cam slide plate shown in FIG. 6 illustrating its pneumatic biasing means;

FIG. 12 is a longitudinal section taken along the line 12—12 of FIG. 10 showing the internal valving of the sensing servo;

FIG. 13 is a longitudinal section taken along the line 13—13 of FIG. 10 illustrating the power piston assembly of the sensing servo; and FIG. 14 is a diagramatic view showing the pneumatic circuit of the sensing servo and its position relative to the cam slide plates of the lens grinding apparatus.

DESCRIPTION OF PREFERRED EMBODIMENT

Figure 1:
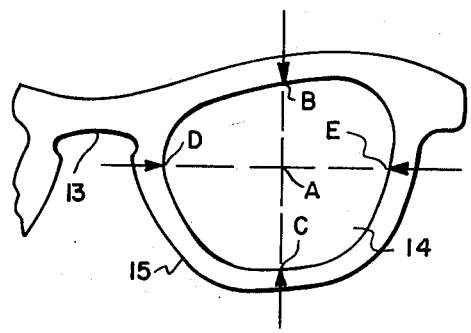
FIG. 1 is a partial view of a conventional eye glass frame and lens.
Figure 2:
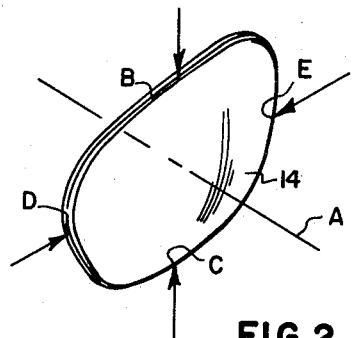
FIG. 2 is a view of a conventional eye glass lens.

Referring more particularly to the drawings by characters of reference, FIG. 1 discloses a part of a pair of eye glasses 13 partially broken away wherein point A represents the axis of lens 14 mounted in frame 15, points B and C represent the vertical meridians and points D and E represent the horizontal meridians of the frame. The axis A, vertical meridian points B and C and horizontal meridian points D and E of the conventional eye glass lens 14 are shown in FIG. 2.

Figure 3:
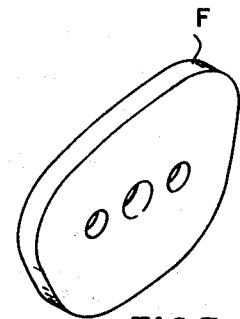
FIG. 3 is a view of a conventional eye glass cam or cam pattern.

A typical cam or cam pattern F representative of such patterns used in the prior art for producing lens 14 is shown in FIG. 3.

Figure 4:
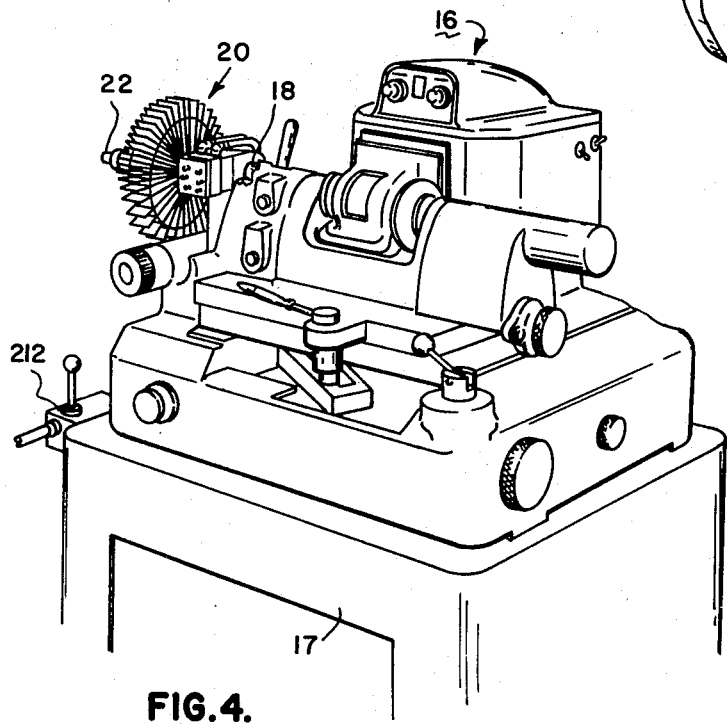
FIG. 4 is a perspective view of a lens edging machine having mounted on it a lens sensing apparatus for sensing the inside periphery of a lens holder and embodying the invention.

FIG. 4 illustrates an eye glass lens grinder 16 mounted on a table 17. The grinder comprises a motor which drives a shaft to which is fixedly attached a grinding wheel for grinding the edges of a lens such as lens 14 which is mounted by suitable gripping or chucking means on shaft 18 all not shown in detail since they comprise parts of well known lens grinding machines of the prior art.

Figure 10:
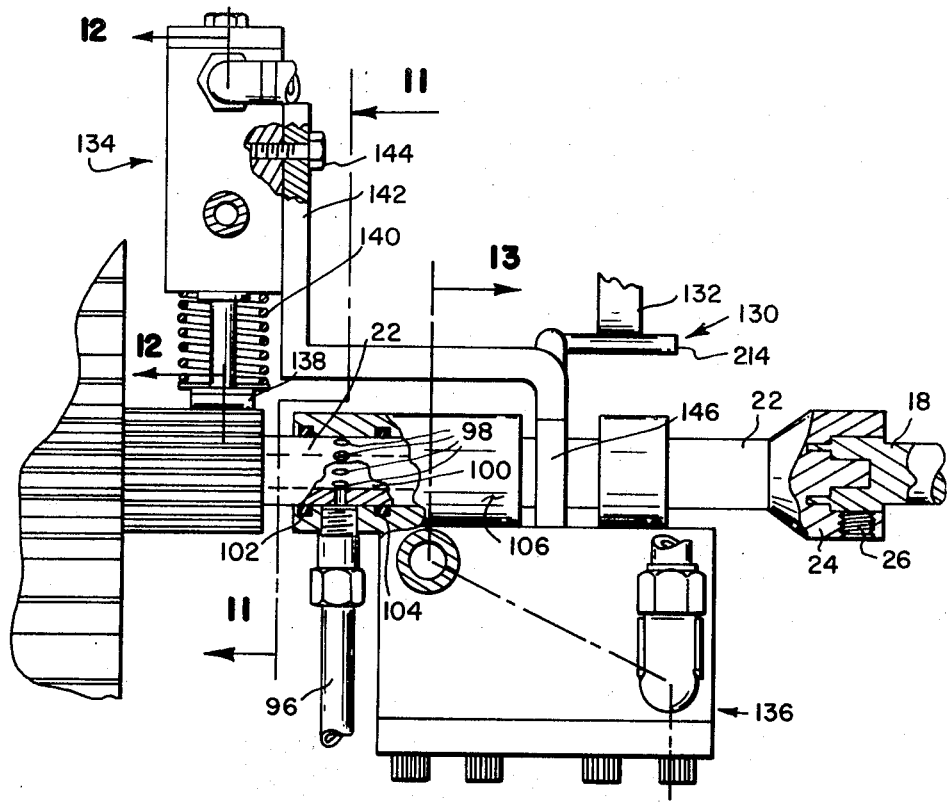
FIG. 10 is a partial plan view illustrating the sensing servo mechanism.

In accordance with the invention claimed a new glass lens edging apparatus 20 is mounted on shaft 18 of grinder 16 as shown in FIGS. 4 and 10 for sensing the inside periphery of a lens holding frame such as but not limited to an eye glass frame. The glass lens edging apparatus comprises a central shaft 22 having a mounting collar 24 fixedly attached to it at one end for mounting on shaft 18 of grinder 16 and firmly held thereon by set screw 26 in mounting collar 24.

Concentrically disposed about the axis of shaft 22 and fixedly attached thereto is a radially fluted disk 32. Disk 32, as shown in FIG. 7, is keyed to shaft 22 by means of a conventional type key 34 fitting into a slot 36 in disk 32 and key slot 38 in shaft 22.

Figure 5:
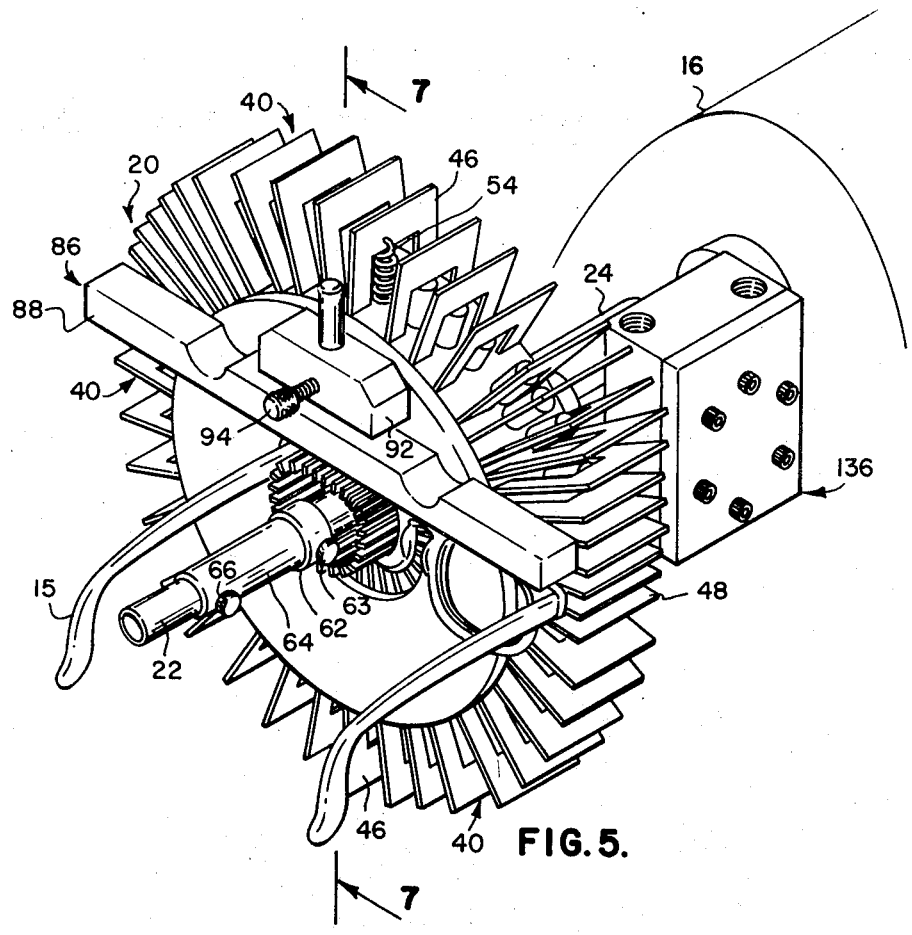
FIG. 5 is an enlarged perspective view of the lens sensing device shown in FIG. 4.
Figure 6:
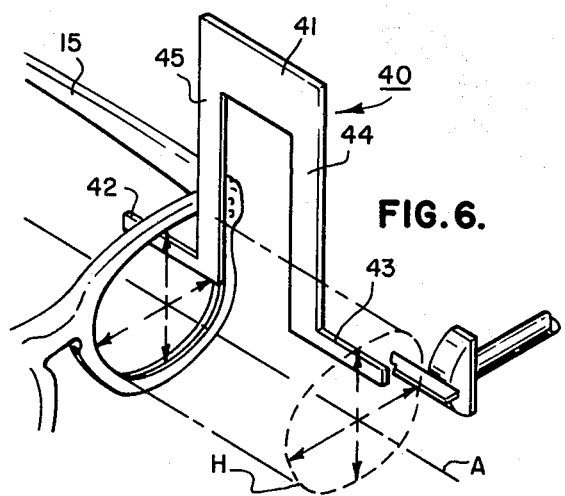
FIG. 6 is an enlarged perspective view of one of the cam slide plates shown in FIG. 5 illustrating its operating position with relationship to a lens frame and a servo mechanism of the lens edging machine shown in FIG. 4.

As shown in FIGS. 5 and 7 of the drawings, a plurality of cam slide plates 40 are spacedly disposed in the radial flutes of disk 32 about the axis of shaft 22. As seen best in FIG. 6, each cam slide plate 40 comprises a U-shaped member 41 provided with laterally extending arms 42 and 43 protruding outwardly from its leg members 44 and 45, respectfully. Arms 42 and 43 of each cam slide plate 40 are axially aligned and parallelly arranged with the center of shaft 22. Each cam slide plate 40 is individually adjustable, by a means to be hereinafter described, allowing the arms 42 and 43 of slide plates 40 to be located at different distances from the axial center of shaft 22 during operation.

Each cam plate 40 is identical in shape with the others except for two cam plates 46 arranged on the vertical meridians of disk 32 and two cam plates 48 arranged on the horizontal meridians of the disk 32. These four cam plates are also identical to one another.

FIG. 7 illustrates how the meridian slide cam plates 46 and 48 are biased radially inwardly on disk 32. Each of these plates is biased inwardly toward the axis of shaft 22 by a spring 54 secured to the inner surface of the U-shaped member 41 forming the cam slide plates 46 and 48 and a spring retaining pin 56 arranged laterally across each aperture 53 formed in disk 32. Springs 54 maintain cam slide plates 46 and 48 in normal retracted positions.

As hereinbefore described cam slide plates 46 and 48 are biased toward shaft 22 by springs 54. In order to extend these cam slide plates outwardly of shaft 22 against the biasing effects of springs 54 during operation, a meridian slide locating device 60 is provided. Cam slide locating device 60, seen best in FIGS. 7 and 8, comprises a pair of longitudinally movable concentrically mounted collars 62 and 64 slidably mounted on shaft 22. These collars have disposed at their inner extremities cam ramps 76 and 70, respectively. Located adjacent to disk 32 on shaft 22 is a collar 74 having pivotally mounted on it two pair of slide engagement levers 78 and 82 engaging the vertical and horizontal cam slide plates 46 and 48, respectively. These levers are hereinafter called vertical, meridian engagement levers 78 and horizontal meridian engagement levers 82. Collar 74 is provided with a set screw 86 to solidly lock collar 74 to shaft 22. Further, it will be seen from FIG. 7 that slide collars 62 and 64 are provided with guide pins 68 and 72 running in guide slots 80 and 84 of collar 64 and shaft 22, respectively.

The collars 62 and 64 may be held in the operable positions by knurled set screws 63 and 66, respectively.

One of the useful purposes to which the disclosed attachment for lens grinders may be used is for grinding lens to fit any and all eye glass frames. Accordingly, FIGS. 5 and 7 show eye glass frame horizontal positioning member or set screw 86 mounted on a retainer plate 58, comprised of a flat bar 88 perpendicularly mounted on a shaft 90. Shaft 90 is slidably mounted in a bore of a guide block 92 which is attached to retainer plate 58. A horizontal positioning means such as a thumb screw 94 is threadedly mounted in guide block 92 and arranged to engage shaft 90.

A pneumatic power system is provided for the extension and retraction of the cam slide plates 40. The pneumatic system is comprised of an air pressure vacuum source 96, as seen best in FIGS. 7 and 10, communicating through a plurality of ports 98 with a bore 100 of shaft 22. Sealing means, such as o-rings 102 and 104 are provided, in a collar 106, to create an effective seal for the ports 98.

The bore 100 as seen best in FIGS. 7 and 9 acts as a manifold carrying air to and from a plurality of chambers 108 formed in openings extending radially outwardly of the periphery of disk 32, by way of an annular port 110 in the shaft 22 communicating with a passage 112, which in turn supplies chambers 108.

The annular port 110 is provided with sealing means, such as O-rings 114 and 116 in disk 32.

A piston 118, is disposed to travel axially in chamber 108 in disk 32, and is provided with sealing means such as an O-ring 120. The O-ring 120 is maintained in the bore 122 or chamber 108 in disk 32.

The piston 118, at its outer extremity, is provided with a slotted portion 124 which straddles the inner edge 126 of cam slide plate 40. Extending laterally through the slotted portion 124 of piston 118, and through inner ridge 126 of cam plate 40, is a retaining pin 128 which provides a mechanical link between piston 118 and cam slide plate 40. If desired a spring 129 may be suitably attached and used in each chamber 108 to bias piston 118 toward shaft 22 or the pistons may be retracted pneumatically.

As seen in FIG. 10 the lens grinding apparatus is provided with sensing servo 130 to accurately transmit the dimensional perameters of the geometric shape H described by the arms 43 of the cam slide plate 40 to the follower pick-up arm 132 of the lens grinder 16.

Figure 11:
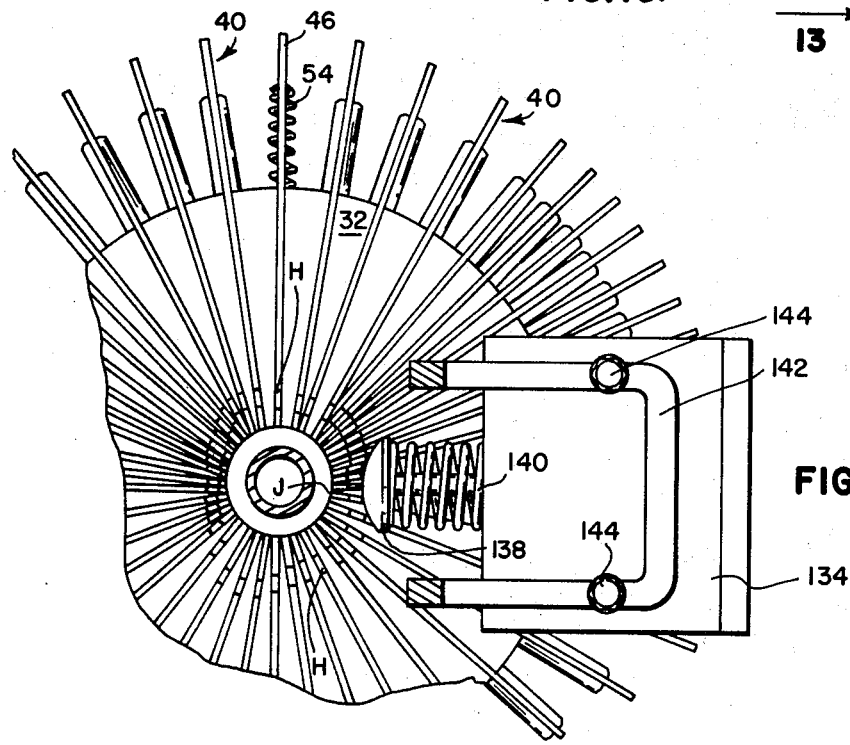
FIG. 11 is a section view taken along the line 11—11 of FIG. 10 illustrating the sensing servo and cam slide plates in their relative positions.

As shown in FIGS. 5, 10 and 11 the sensing servo is made up of two pneumatically linked but separate units, the interaction of which provides precise translation of the cam surface H to the lens grinder. The sensing servo assembly is comprised of a sensing valve 134 and a power multiple means or servo 136.

As seen in FIG. 11 the sensing valve 134 is provided with a spring biased follower 138, which is biased by a spring or other resilient means 140, which tracks against the periphery of the cam surface H. The sensing valve 134 is supported, perpendicular to shaft 22 on a frame 142, by bolts 144, and thereby transfers dimensional data to the piston shaft portion 146 of frame 142 and to the power servo.

The power servo is supported by collar 106 and as seen in FIG. 13, is provided with a piston 148 with a suitable sealing means 150 maintained in an annular groove 152 about its periphery, travelling axially in a bore 154 of the servo body 156, said servo body being provided with an end plate 158 held in place by a plurality of bolts 160.

The piston shaft portion 146 of frame 152 is attached at its internally threaded ends 162 to the piston 148 by screws 164.

Further, the servo body is provided with pneumatic ports 166 and 168 which communicate with chambers 170 and 172 respectively on opposite sides of the piston 148.

Referring to FIG. 12 the sensing valve 134 is provided with a body 174 into the bore 176 of which is inserted a valve body 178, valve body 178 being held in place by bolts 180 threaded into body 174. A plurality of seals 182 are provided to effect a seal between the chambers 184 and 186 of the valve body 178 and also between chambers 182 and 184 and atmosphere.

Ports 188 and 190 in the servo body 174 communicate with valve chambers 186 and 184 respectively. Also shown is an atmospheric vent 189 communicating with a chamber 191 of the valve body 178. The valve body 178 is provided with an internal bore 192 in which is contained a slide valve 194, said valve 194 having a substantially reduced diameter portion 196. The slide valve 194 has an end 198 which has affixed to its extremity cam follower 138.

Shown in diagrammatic fashion in FIG. 14 is the pneumatic plumbing circuit. It will be seen that air lines 200 and 202 between the power servo 136 and the air source are tee fittings 204 and 206, respectively, attached to which, and communicating with, the sensing servo 134, are bleed lines 208 and 210.

OPERATION

In order to utilize the lens edging apparatus for grinding eye glass lenses, the unit is mounted on the end of the rotatable shaft 18 of the eye glass lens grinder 16 by sliding mounting collar 24 over shaft 18 and tightening down on set screw 26 shown in FIG. 10.

Any given eye glass frame such as frame 15 is mounted without lenses in place on the eye glass lens edging apparatus 20 by sliding the lens opening of frame 15 over shaft 22 and the slide collars 62 and 64 to a position substantially concentric with the axis of shaft 22 and encompassing the plurality of arms 42 of the cam slide plates 40.

To insure exact horizontal alignment of the axis of the lens opening of frame 15 with shaft 22, the flat bar 88 of the horizontal positioning means 86 is released by loosening thumb screw 94 causing shaft 90 connected to flat bar 88 to slide through guide block 92 causing flat bar 88 to rest directly on top of frame 15 as shown in FIG. 5.

Slide collar 64 and associated cam ramps 70 are then slide longitudinally along shaft 22 engaging levers 78 causing them to bear against the inner surfaces of arms 42 of the vertical meridian cam slide plates 46 forcing them away from the axis of shaft 22 into engagement with the inner rim of the lens opening of frame 15, at equal distances from the axis of shaft 22, at points B and C as shown in FIG. 1. Slide collar 62 and its cam ramps 76 are then slid longitudinally over slide collar 64 causing cam ramp 76 to engage levers 82 causing them to bear on the inner surfaces of arms 42 of the horizontal meridian cam slide plates 48. This action forces cam slide plates 48 away from the axis of shaft 22 causing them to bear against the inner rim of frame 15 at equal distances from the axis of shaft 22 at points D and E, as shown in FIG. 1. With the meridian cam slide plates 46 and 48 located as described, the axial center A of the lens opening in frame 15 has been concentrically located with reference to the axis of shaft 22 of the lens edging apparatus 20. Thumb screw 94 of the positioning means 86 is now locked in place holding frame 15 against the retainer plate 58.

With the lens opening of eye glass frame 15 located concentrically about the axis of shaft 22 and the entire eye glass frame 15 arranged substantially vertical and horizontal to meridian cam slide plates 46 and 48, respectively, the plurality of cam slide plates 40 are forced radially outward in fluted disk 32 by the introduction of air under pressure through manual valve 212, seen in FIG. 4, to piston 118 by way of bore 100, of shaft 22, and port 112, allowing the arms 42 of cam slide plates 40 to be brought to bear against the inner periphery of the lens opening of frame 15 thereby describing the geometric shape H of the lens frame with the opposite arms 43 of the cam slide plates 40.

With the lens frame 15 mounted and axially aligned on the lens grinding apparatus, the rotation of the shaft 18 of the lens grinding machine 16 is begun carrying with it the lens grinding apparatus 20.

As the lens grinding apparatus 20 rotates, the geometric surface H, described by the arms 43 of the cam slide plates 40 is followed at a point J by the sensing servo follower 138 and the dimensional data, with reference to the axis of shaft 22, is transmitted to the lens grinding machine at arm 132 in the following manner.

Referring to FIGS. 11, 12, 13 and 14 when the follower 138 is depressed against the spring biasing means 140 by a protruding portion of the surface H, slide valve 194 closes port 188 and opens port 190 thereby exhausting air from air supply line 200 to atmosphere through chamber 184 into chamber 191 and out to atmosphere through port 189.

The exhausting of air from supply line 200 and the closing of port 188, thereby increasing pressure in supply line 202 effecting a pressure differential across the piston 148 of the power servo 136. Said differential being caused by a drop of pressure in chamber 170 due to exhausting supply line 200 through port 189 of the sensing valve and an increase in pressure in chamber 172 due to closing of port 188.

The resulting differential forces the piston 148 back into the bore 154 of the power servo 136, the piston 148 being connected to sensing servo 134 by means of the interconnected piston link 146 and carrying frame 142, then moves the sensing servo back to a point at which the pressure in chamber 170 and 172 of the power servo are equalized. The equalization of said pressure is achieved by the sensing servo 134. When it is carried back on the frame 142, connected to piston 148, the follower 138 is forced forward by spring 140 thereby moving portion 196 of slide valve 194 to a position in which both ports 188 and 190 are partially open and are exhausting to atmosphere. This position of the servo system will remain constant until the distance, due to rotation of shaft 18, between the axial center of shaft 22 and surface H changes, then the servo assembly will cycle in the hereinbefore described manner, moving to equalize itself, with the resulting movement being transmitted to the lens grinding machine 16 at arm 132 by an extension 214 of piston link 146.

It will be seen that an extremely accurate transmission of dimensional data is possible by use of the hereinbefore described servo system due to the small amount of pressure exerted on surface H, so as not to disturb the actual geometric pattern and by the multiplication of power by the power servo to the following arm 132 of the lens grinding machine.

It should be recognized that cam slide plates 40 may be equally or unequally spaced around the periphery of disk 32 so as to increase or decrease the number of arms 43 forming the image of the design sensed by arms 42. This is particularly important with design configurations requiring more cam slide plate arm surfaces to define the outline of the configuration being reproduced.

Since cam slide plates 40, 46 and 48 define at other positions on them a replica of the lens opening being sensed by arms 42 of these cam slide plates, sensing arms of a grinder may obtain useful information from other areas of the cam slide plates than arms 42 and 43 if so desired.

It should be recognized that the spring biasing means 54 for cam plates 46 and 48 may be replaced by suitable pneumatic or hydraulic means and still fall within the scope of the disclosed invention.

Although but one embodiment of the present invention has been illustrated and described, it will be apparent to those skilled in the art that various changes and modifications may be made therein without departing from the spirit of the invention or from the scope of the appended claims.

What is claimed is:

1. A lens edging apparatus comprising in combination:
   a rotatable shaft,
   a disk fixedly mounted on said shaft for rotation therewith,
   a plurality of cam means spacedly arranged and slidably mounted on said disk for movement radially thereof,
   pneumatic means one for each of said cam means mounted between said disk and said cam means for biasing said cam means radially outwardly of said disk,
   each of said cam means being provided with an arm extending laterally thereof in a common direction,
   said arm of each of said cam means being movable radially of said disk upon radial movement of said cam means,
   releasable means for biasing said cam means radially inwardly of the outer periphery of said disk,
   clamping means mounted on said disk for holding a lens frame around the ends of said arms when they are biased inwardly by said releasable means,
   said releasable means upon being released causing each arm of said cam means to be biased outwardly until it is stopped by the inner periphery of the lens frame,
   said cam means when said arms are retained by the lens frame defining a geometrical configuration which is a replica of the inner periphery of the lens frame for sensing by a lens forming machine,
   a means for sensing the geometrical configuration of said cam means when said arms are retained by the lens frame, and
   a force multiplying means connected to said sensing means for transmitting information representative of the position of the cam means sensed by said sensing means to the lens forming machine as multiples thereof.

2. The lens edging apparatus set forth in claim 1 wherein said force multiplying means comprises a pneumatic power servo mechanism.

3. The lens edging apparatus set forth in claim 1 wherein said means for sensing the geometrical configuration of said cam means comprises a sensing valve, said sensing valve comprising a spring biased follower for following the outline of said cam means, a slide valve connected to said follower, a cylinder for housing said slide valve, and a plurality of ports for selectively connecting said cylinder to atmosphere and to said force multiplying means to control the lens forming machine.

4. A lens edging apparatus comprising in combination:
   a rotatable shaft,
   disk means fixedly mounted on said shaft for rotation therewith,
   clamping means mounted on said disk means for holding a lens frame around the end of said shaft,
   sensing means associated therewith for movement radially of said shaft,
   said sensing means arranged to extend within and biased into contact with the inside periphery of said lens frame,
   and means connected to said sensing means for transmitting information representative of the position of said sensing means upon rotation of said lens frame to a lens forming machine,
   said means for transmitting information representative of the position of said sensing means comprising a force multiplying means.

5. The lens edging apparatus set forth in claim 4 wherein:
   said force multiplying means comprises a power servo mechanism.

6. The lens edging apparatus set forth in claim 5 wherein said force multiplying means comprising a pneumatic power servo mechanism.

7. The lens edging apparatus set forth in claim 4 wherein:
   said means connected to said sensing means comprises a sensing valve,
   said sensing valve comprising a spring biased follower for following the outline of said cam means,
   a slide valve connected to said follower,
   a cylinder for housing said slide valve,
   and a plurality of ports for selectively connecting said cylinder to atmosphere and to said force multiplying means to control the lens forming machine.

* * * * *